(12) United States Patent
Saje et al.

(10) Patent No.: US 9,233,720 B2
(45) Date of Patent: Jan. 12, 2016

(54) OPTIMIZED HIGH STRENGTH LATERAL BEAM SYSTEM

(71) Applicant: GM Global Technology Operations LLC, Detroit, MI (US)

(72) Inventors: Robert N. Saje, Shelby Township, MI (US); John C. Johnson, Macomb Township, MI (US); Terry A. Swartzell, Ann Arbor, MI (US); Kevin J. Lindsey, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/166,107

(22) Filed: Jan. 28, 2014

(65) Prior Publication Data

US 2015/0001886 A1     Jan. 1, 2015

Related U.S. Application Data

(60) Provisional application No. 61/840,970, filed on Jun. 28, 2013.

(51) Int. Cl.
*B62D 25/20*     (2006.01)

(52) U.S. Cl.
CPC ........... *B62D 25/20* (2013.01); *Y10T 29/49622* (2015.01)

(58) Field of Classification Search
CPC .... B62D 21/03; B62D 25/20; B62D 25/2027; B62D 25/2036; B62D 25/2045

USPC ............. 296/187.08, 187.12, 193.02, 193.05, 296/193.07, 203.01, 203.03, 204, 205
See application file for complete search history.

(56) References Cited

U.S. PATENT DOCUMENTS

| | | | | |
|---|---|---|---|---|
| 3,550,948 | A | * | 12/1970 | Thompson, Jr. ............ 296/181.2 |
| 4,205,872 | A | * | 6/1980 | Bollinger ....................... 296/205 |
| 4,660,345 | A | * | 4/1987 | Browning ..................... 52/653.2 |
| 5,725,270 | A | * | 3/1998 | Fleishman .................. 296/181.1 |
| 6,189,952 | B1 | * | 2/2001 | Schmidt et al. ........... 296/187.12 |
| 6,464,290 | B2 | * | 10/2002 | Schwarz et al. .......... 296/203.03 |
| 6,568,745 | B2 | * | 5/2003 | Kosuge et al. ........... 296/193.02 |
| 7,077,459 | B2 | * | 7/2006 | Toth et al. ...................... 296/178 |
| 7,448,674 | B2 | * | 11/2008 | Brunner et al. .......... 296/193.02 |
| 7,481,486 | B2 | * | 1/2009 | Rashidy et al. .......... 296/193.02 |
| 7,798,562 | B2 | * | 9/2010 | Wrobel et al. ........... 296/193.02 |
| 8,029,046 | B2 | * | 10/2011 | Yamada .................... 296/193.02 |
| 8,162,388 | B2 | * | 4/2012 | Balzer et al. ............. 296/203.03 |
| 8,167,360 | B2 | * | 5/2012 | Deng et al. ............... 296/187.08 |
| 8,235,459 | B2 | * | 8/2012 | Wendling et al. ........ 296/193.07 |
| 8,246,104 | B2 | * | 8/2012 | Ohkubo et al. ........... 296/187.08 |
| 8,276,977 | B2 | * | 10/2012 | Tanaka et al. ............ 296/187.12 |
| 8,353,381 | B2 | * | 1/2013 | Melvin ......................... 180/311 |
| 8,360,472 | B2 | * | 1/2013 | Froschle ....................... 280/756 |
| 8,585,128 | B2 | * | 11/2013 | Hoshino .................... 296/187.05 |
| 8,764,102 | B2 | * | 7/2014 | Abe et al. ................. 296/193.02 |
| 8,851,558 | B2 | * | 10/2014 | Asaga et al. ............. 296/203.01 |

(Continued)

*Primary Examiner* — Gregory Blankenship
(74) *Attorney, Agent, or Firm* — BrooksGroup

(57) ABSTRACT

A product comprising a lateral beam system which may include a 4-bar beam having a first bend forming a constant sweep across the length of the lateral beam creating a vertical arc and a second bend forming a constant sweep across the length of the lateral beam creating a horizontal arc and which may also include a plurality of brackets which may be attached to the 4-bar beam and wherein the lateral beam system may be attached to a vehicle at an angled toward the front of the vehicle and a method of making the same.

19 Claims, 4 Drawing Sheets

(56) References Cited

U.S. PATENT DOCUMENTS

| | | | |
|---|---|---|---|
| 2002/0057004 A1* | 5/2002 | Corcoran et al. | 296/203.01 |
| 2012/0267918 A1* | 10/2012 | Murata | 296/204 |
| 2014/0232141 A1* | 8/2014 | Mochizuki | 296/193.07 |
| 2015/0001886 A1* | 1/2015 | Saje et al. | 296/193.07 |

* cited by examiner

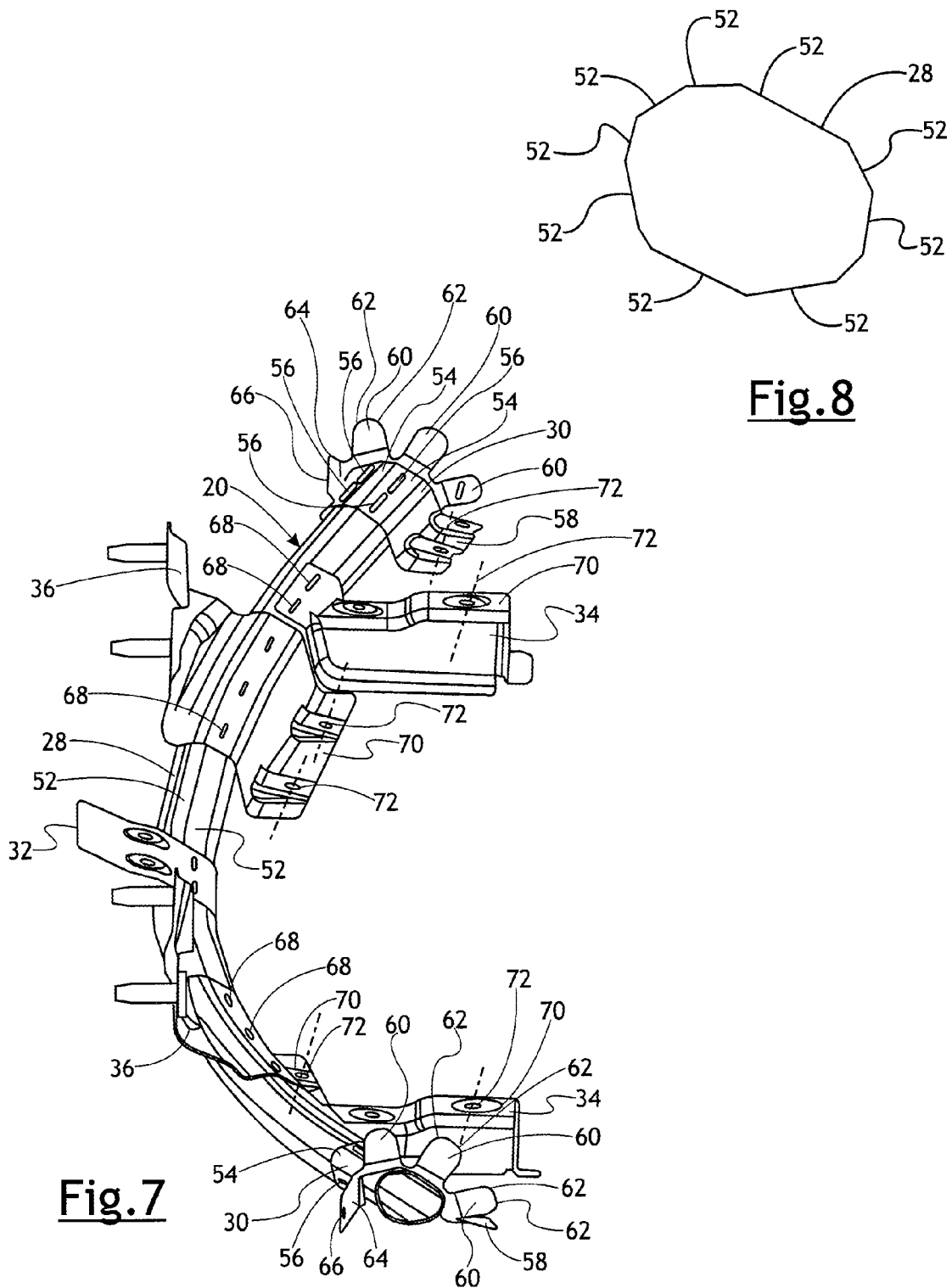

OPTIMIZED HIGH STRENGTH LATERAL BEAM SYSTEM

CROSS-REFERENCE TO RELATED APPLICATIONS

This application claims the benefit of U.S. Provisional Application No. 61/840,970 filed Jun. 28, 2013.

TECHNICAL FIELD

The field to which the disclosure generally relates to includes vehicle frame structures.

BACKGROUND

A vehicle may include a frame structure.

SUMMARY OF ILLUSTRATIVE VARIATIONS

One variation may include a product comprising: a lateral beam system comprising: a 4-bar beam; wherein the 4-bar beam includes a first bend and a second bend; wherein the first bend forms a constant first sweep forming a vertical arc; wherein the second bend forms a constant second sweep forming a horizontal arc; and wherein a plurality of mounting brackets are attached to the 4-bar beam.

Another variation may include a method comprising: forming a 4-bar beam with a plurality of planar surfaces to mate with a plurality of brackets; bending the 4-bar beam twice to create a first sweep and a second sweep; and fixing the 4-bar beam into a vehicle at an angle.

Other illustrative variations within the scope of the invention will become apparent from the detailed description provided hereinafter. It should be understood that the detailed description and specific examples, while disclosing variations of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein:

FIG. 7 depicts a perspective view of a lateral beam system according to a number of variations.

FIG. 8 depicts a profile view of a 4-bar beam according to a number of variations.

DETAILED DESCRIPTION OF ILLUSTRATIVE VARIATIONS

The following description of the variations is merely illustrative in nature and is in no way intended to limit the scope of the invention, its application, or uses.

Figure 1:
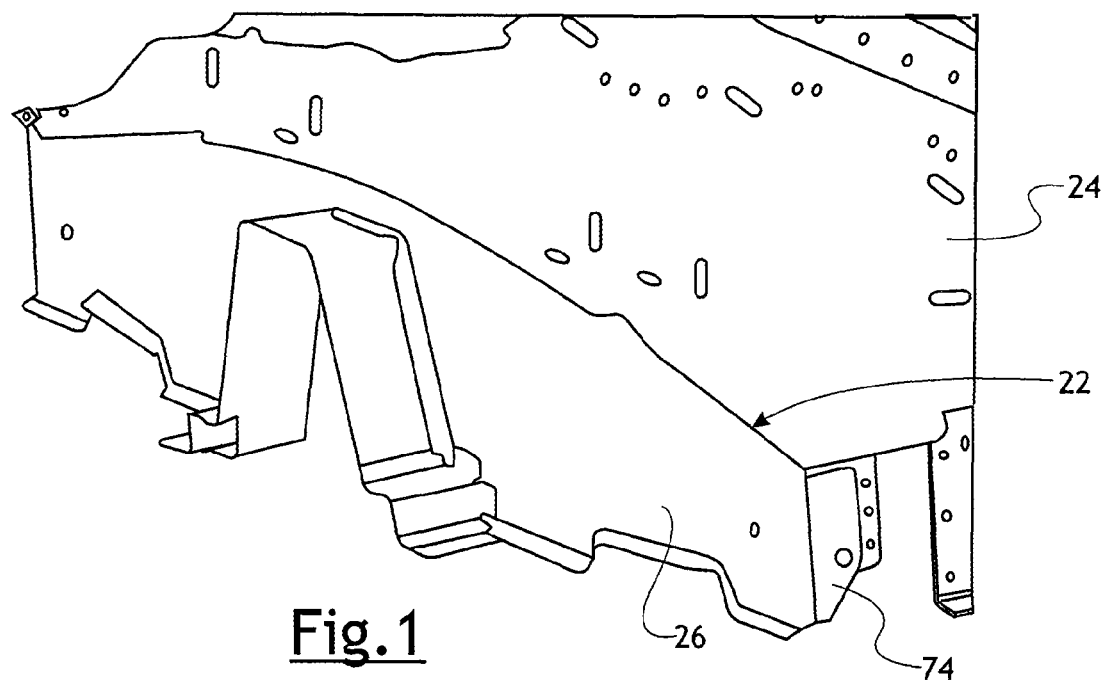
FIG. 1 depicts a perspective view of a lateral beam system with close-out pans attached to it according to a number of variations.
Figure 2:
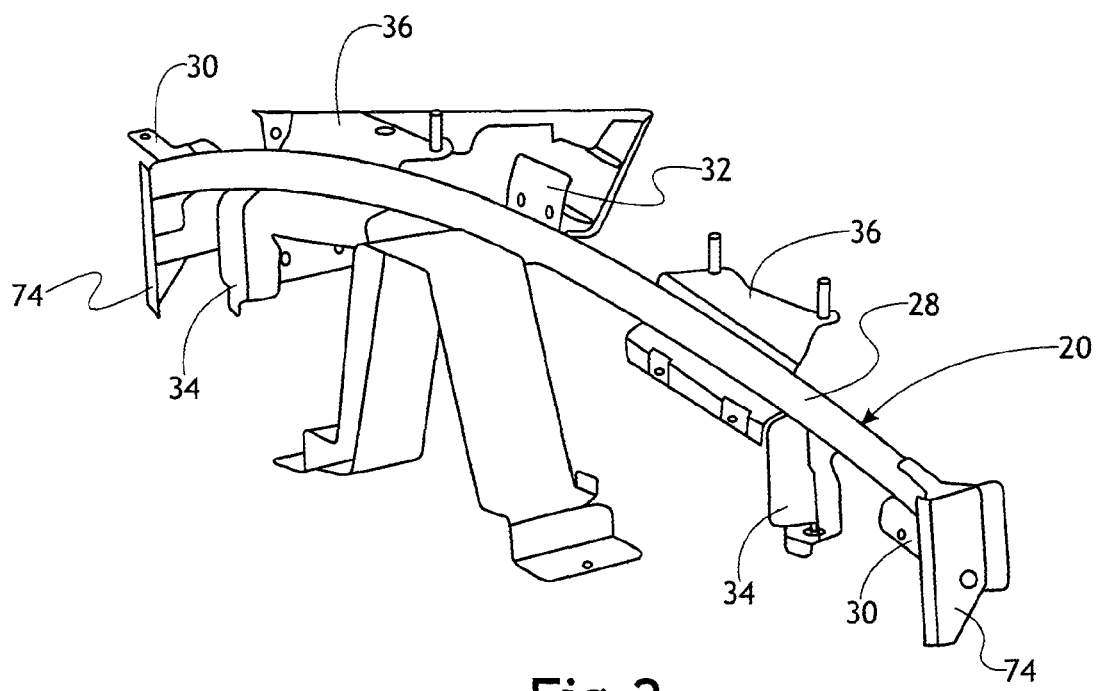
FIG. 2 depicts a perspective view of a lateral beam system according to a number of variations.

Referring to FIGS. 1-2, in one variation, a lateral beam system 20 may be incorporated into the 4-bar/waterfall area 22 of a vehicle which may be located between the front floor (not illustrated) and the second row seat pan transition area and may be seated adjacent the second row seat pan 24 and the waterfall 26 close out panels.

Figure 3:
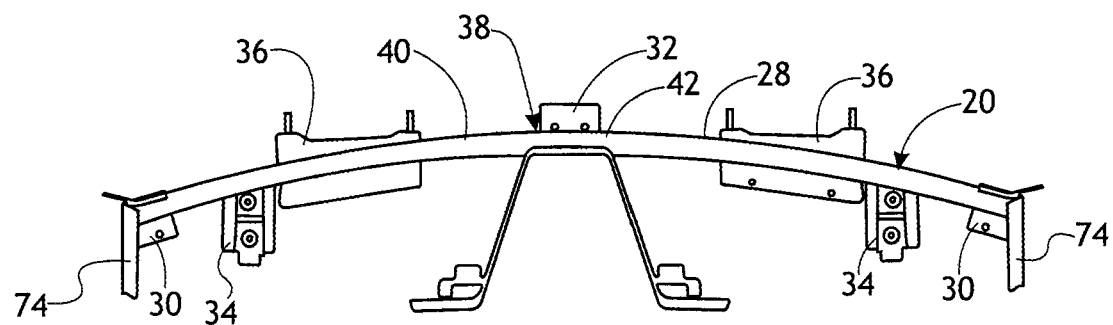
FIG. 3 depicts a frontal view of a lateral beam system according to a number of variations.
Figure 4:
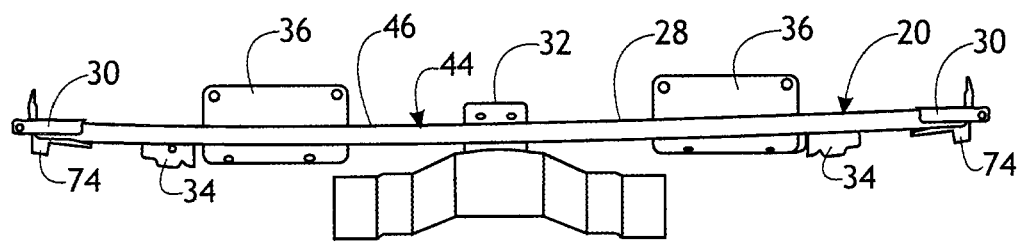
FIG. 4 depicts a plan view of a lateral beam system according to a number of variations.

Referring to FIGS. 3-4, the lateral beam system 20 may include a 4-bar beam 28, two 4-bar beam mounting brackets 30 and at least one vehicle component mounting bracket 32, 34, 36, which may include, but is not limited to, a center fuel tank bracket 32, a set of side fuel tank brackets 34, and/or a pair of seat anchor brackets 36. The 4-bar beam 28 may be configured in any of a number of variations. In one variation, the 4-bar beam 28 may include a first bend 38. The first bend 38 may create a constant gradual symmetrical first sweep 40 across the length of the 4-bar beam 28 which may form a vertical shallow arc 42 when viewed from the front of the vehicle, for example as illustrated in FIG. 3. This constant first sweep 40 may provide additional space in the occupant compartment which may provide an occupant with additional leg room and may improve an occupant's ability to enter and exit a vehicle.

The 4-bar beam 28 may also include a second bend 44. The second bend 44 may create a constant gradual second sweep 46 forming a shallow horizontal arc toward the rear of the vehicle when viewed from a plan view, for example as illustrated in FIG. 4. The constant second sweep 46 may also provide additional space in the occupant compartment which may provide an occupant with additional leg room and may improve an occupant's ability to enter and exit a vehicle.

The first sweep 40 and the second sweep 46 configuration of the 4-bar beam 28 may also improve the manufacturing and dimensional accuracy of the 4-bar beam 28 and the lateral beam system 20.

Figure 5:
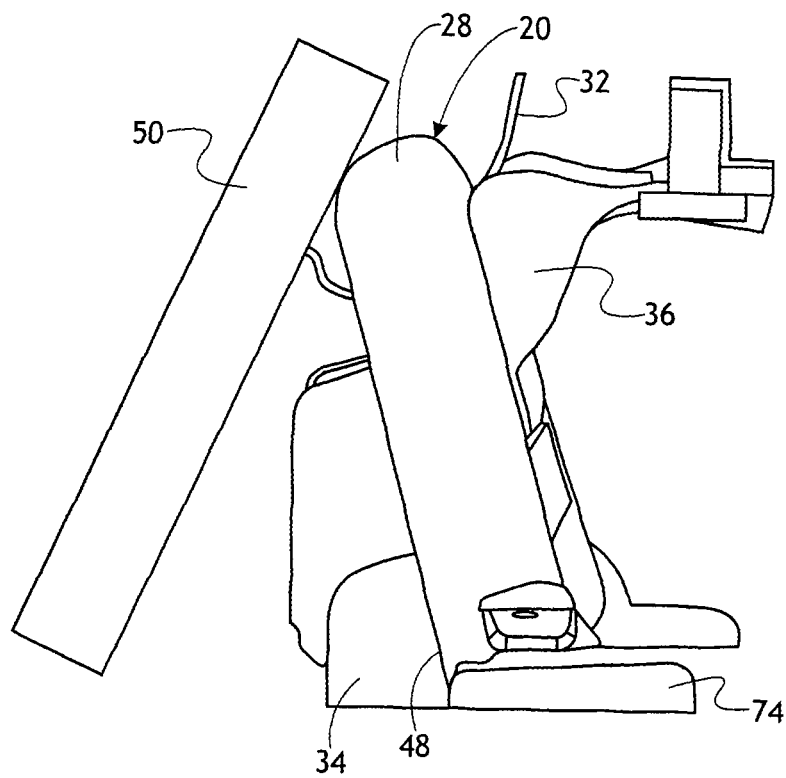
FIG. 5 depicts a side view of a lateral beam system according to a number of variations.
Figure 6:
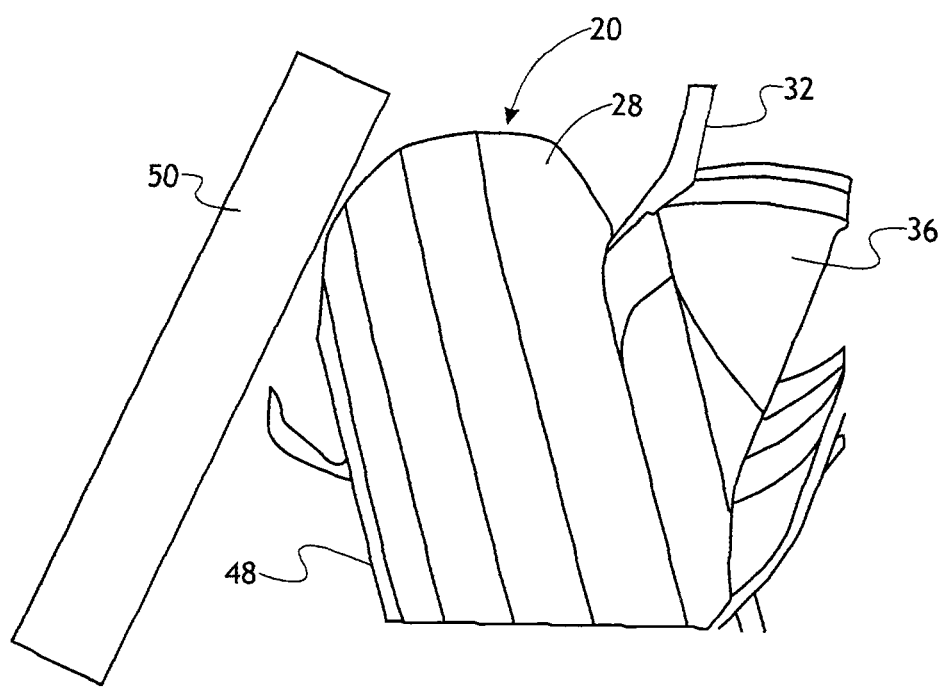
FIG. 6 depicts a close-up side view of a lateral beam system according to a number of variations.

Referring to FIGS. 5-6, the 4-bar beam 28 may also be attached to the vehicle frame at an angle 48 toward the front of the vehicle. This may provide additional space in the occupant compartment which may provide the occupant with additional leg room resulting from the angle of the leg 50 when seated in the vehicle and may improve an occupant's ability to enter and exit a vehicle. This may also provide additional space which may be used to improve the packaging of other vehicle components including, but not limited to, the fuel tank and seats.

Referring to FIGS. 7-8, a 4-bar beam 28 may include several planar surfaces or faces 52 extending along the length of the 4-bar beam 28. Each planar face 52 may be configured for a different purpose including, but not limited to, orienting and accepting various brackets 30, 32, 34, 36 or positioning of the angle of a seat.

A 4-bar beam mounting bracket 30 may be located on each end of the 4-bar beam 28. The 4-bar beam mounting brackets 30 may be constructed and arranged to accept the end of the 4-bar beam 28. Therefore, the 4-bar beam mounting bracket 30 may include several planar faces 54 which may mate with one or more of the several planar faces 52 of the 4-bar beam 28. At least one of the several planar faces 54 may include one or more holes or slots 56 which may be used for attaching the 4-bar beam mounting brackets 30 to the 4-bar beam 28 by welding. The 4-bar beam mounting bracket 30 may also include an extension which may be used as a datum surface 58. The 4-bar beam mounting brackets 30 may also include at least one planar flange 60 which may extend at an angle outward from the planar faces 54. The at least one planar flange 60 may have rounded corners 62. The at least one planar flange 60 may be used for spot welding the 4-bar beam mounting bracket 30 to the vehicle structure. The 4-bar beam mounting brackets 30 may also include at least one tab 64. The tab 64 may include a hole or slot 66 which may be used in the assembly of the vehicle.

The one or more vehicle component mounting brackets 32, 34, 36 may also each be constructed and arranged to mate with at least one of the planar faces 52 of the 4-bar beam 28. The vehicle component mounting brackets 32, 34, 36 may also include one or more holes or slots 68 which may be used to weld the vehicle component mounting brackets 32, 34, 36 to the 4-bar beam 28.

Each of the 4-bar mounting brackets 30 and the vehicle component mounting brackets 32, 34, 36 may also include a datum surface 58, 70 which may include a hole or a slot 72. The hole or slot 72 on the datum surface 58, 70 may be constructed and arranged to mate with a pin on an assembly fixture (not illustrated). Each of the vehicle component brackets 32, 34, 36 and the 4-bar beam mounting bracket 30 datum surfaces 58, 70 may be tipped or angled so that they lay on the same plane. During assembly of the lateral beam system 20, the brackets 30, 32, 34, 36 may be placed onto the pins through the holes or slots 72 on the datum surfaces 58, 70. The uniform tipped or angled datum surfaces 58, 70 may allow for extraction of the lateral beam system 20 from the assembly fixture in one motion which may allow for the use of stationary pins rather than the use of retractable pins. The use of stationary pins may improve manufacturability.

The 4-bar beam 28 may be comprised of any of a number of materials including, but not limited to, high strength steel. The 4-bar beam 28 may be formed in any of a number of variations including, but not limited to, roll forming. The 4-bar beam mounting brackets 30 may be attached to each end of the 4-bar beam 28 in any of a variety of ways including, but not limited to metal inert gas (mig) welding. The one or more vehicle component mounting brackets 32, 34, 36 may also include one or more holes or slots 68 which may be used for welding the mounting brackets 32, 34, 36 onto the 4-bar beam 28. The planar flanges 60 on the 4-bar beam mounting brackets 30 may then be attached to the vehicle for example, but not limited to, mig welding the planar flanges 60 to the rocker brackets 74.

The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may include a product comprising: a lateral beam system comprising: a 4-bar beam; wherein the 4-bar beam includes a first bend and a second bend; wherein the first bend forms a constant first sweep forming a vertical arc; wherein the second bend forms a constant second sweep forming a horizontal arc; and wherein a plurality of mounting brackets are attached to the 4-bar beam.

Variation 2 may include a product as set forth in Variation 1 wherein the first bend and the second bend are constructed and arranged to provide additional leg room in an occupant compartment of a vehicle.

Variation 3 may include a product as set forth in any of Variations 1-2 wherein the 4-bar beam includes a plurality of faces extending along the length of the 4-bar beam.

Variation 4 may include a product as set forth in any of Variations 1-3 wherein the plurality of faces are constructed and arranged to accommodate the plurality of mounting brackets.

Variation 5 may include a product as set forth in any of Variations 1-4 wherein the plurality of mounting brackets includes a pair of 4-bar mounting brackets, a center fuel tank bracket, a pair of side fuel tank brackets, and a pair of seat anchor brackets.

Variation 6 may include a product as set forth in any of Variations 1-5 wherein the plurality of mounting brackets are attached to the 4-bar beam.

Variation 7 may include a product as set forth in any of Variations 1-6 wherein the plurality of mounting brackets include a datum surface; and wherein each of the plurality of mounting bracket datum surfaces include a hole or a slot constructed and arranged to a accept a pin on an assembly fixture.

Variation 8 may include a product as set forth in any of Variations 1-7 wherein each of the plurality of mounting bracket datum surfaces lay on the same plane.

Variation 9 may include a product as set forth in any of Variations 1-8 wherein the lateral beam system is constructed and arranged to attach to a vehicle body.

Variation 10 may include a product as set forth in any of Variations 1-9 wherein the 4-bar beam includes a pair of 4-bar beam mounting brackets; and wherein the 4-bar beam mounting brackets are each attached to a pair of rocker brackets.

Variation 11 may include a product as set forth in any of Variations 1-10 wherein each of the 4-bar beam mounting brackets are welded to the rocker brackets.

Variation 12 may include a product as set forth in any of Variations 1-11 wherein the lateral beam is located at the waterfall area of the vehicle body.

Variation 13 may include a product as set forth in any of Variations 1-12 wherein the 4-bar beam is angled toward the front of a vehicle.

Variation 14 may include a product as set forth in any of Variations 1-13 wherein the angle of the lateral beam system is constructed and arranged to provide additional leg room in an occupant compartment of the vehicle.

Variation 15 may include a product as set forth in any of Variations 1-14 wherein the angle of the lateral beam is constructed and arranged to accommodate the packaging of at least one vehicle component.

Variation 16 may include a product as set forth in any of Variations 1-15 wherein the at least one vehicle component includes a fuel tank or seat.

Variation 17 may include a product as set forth in any of Variations 1-16 wherein the lateral beam system comprises steel.

Variation 18 may include a method comprising: forming a 4-bar beam with a plurality of planar surfaces to mate with a plurality of brackets; bending the 4-bar beam twice to create a first sweep and a second sweep; and fixing the 4-bar beam into a vehicle at an angle.

Variation 19 may include a method as set forth in Variation 18 wherein the first sweep forms a vertical arc and wherein the second sweep forms a horizontal arc.

Variation 20 may include a method as set forth in any of Variations 18-19 wherein a plurality of brackets are attached to the 4-bar beam; wherein the plurality of brackets include a datum surface; wherein the datum surfaces each lay on the same plane; wherein the datum surfaces each include a datum hole or slot; and wherein the datum hole or slot is constructed and arranged to mate with a stationary pin on an assembly fixture.

The above description of select variations within the scope of the invention is merely illustrative in nature and, thus, variations or variants thereof are not to be regarded as a departure from the spirit and scope of the invention.

What is claimed is:

1. A product comprising:
a lateral beam system comprising:
a beam having a plurality of planar surfaces;
wherein the beam includes a first bend and a second bend;
wherein the first bend forms a constant first sweep forming a vertical arc;
wherein the second bend forms a constant second sweep forming a horizontal arc;
wherein a plurality of mounting brackets are attached to the beam; and
wherein the beam is disposed within a waterfall area of a vehicle at an angle.

2. The product of claim 1 wherein the first bend and the second bend are constructed and arranged to provide additional leg room in an occupant compartment of a vehicle.

3. The product of claim 1 wherein the beam includes a plurality of faces extending along the length of the beam.

4. The product of claim 3 wherein the plurality of faces are constructed and arranged to accommodate the plurality of mounting brackets.

5. The product of claim 1 wherein the plurality of mounting brackets includes a pair of beam mounting brackets, a center fuel tank bracket, a pair of side fuel tank brackets, and a pair of seat anchor brackets.

6. The product of claim 1 wherein the lateral beam system is constructed and arranged to attach to a vehicle body.

7. The product of claim 6 wherein the beam is angled toward the front of a vehicle.

8. The product of claim 7 wherein the angle of the lateral beam system is constructed and arranged to provide additional leg room in an occupant compartment of the vehicle.

9. The product of claim 6 wherein an angle of the lateral beam is constructed and arranged to accommodate the packaging of at least one vehicle component.

10. The product of claim 9 wherein the at least one vehicle component includes a fuel tank or seat.

11. The product of claim 1 wherein the lateral beam system comprises steel.

12. A method comprising:
forming a beam with a plurality of planar surfaces to mate with a plurality of brackets;
bending the beam twice to create a first sweep and a second sweep; and
fixing the beam into a waterfall area of a vehicle at an angle.

13. The method of claim 12 further comprising forming the first sweep into a vertical arc and forming the second sweep into a horizontal arc.

14. A product comprising:
a lateral beam system comprising:
a beam;
wherein the beam includes a first bend and a second bend;
wherein the first bend forms a constant first sweep forming a vertical arc;
wherein the second bend forms a constant second sweep forming a horizontal arc;
wherein a plurality of mounting brackets are attached to the beam;
wherein the plurality of mounting brackets include a datum surface; and
wherein each of the plurality of mounting bracket datum surfaces include a hole or a slot constructed and arranged to a accept a pin on an assembly fixture.

15. The product of claim 14 wherein each of the plurality of mounting bracket datum surfaces lay on the same plane.

16. A product comprising:
a lateral beam system comprising:
a beam;
wherein the beam includes a first bend and a second bend;
wherein the first bend forms a constant first sweep forming a vertical arc;
wherein the second bend forms a constant second sweep forming a horizontal arc;
wherein a plurality of mounting brackets are attached to the beam;
wherein the lateral beam system is constructed and arranged to attach to a vehicle body;
wherein the beam includes a pair of beam mounting brackets; and
wherein the beam mounting brackets are each attached to a pair of rocker brackets.

17. The product of claim 16 wherein each of the beam mounting brackets are welded to the rocker brackets.

18. The product of claim 16 wherein the lateral beam system is located at the waterfall area of the vehicle body.

19. A method comprising:
forming a beam with a plurality of planar surfaces to mate with a plurality of brackets;
bending the beam twice to create a first sweep and a second sweep; and
fixing the beam into a vehicle at an angle;
attaching a plurality of brackets to the beam;
providing a datum surface on each of the plurality of brackets, and wherein the datum surfaces each lay on the same plane;
providing a hole or slot in each of the datum surfaces; and
mating the datum hole or slot with a stationary pin on an assembly fixture.

* * * * *